(12) United States Patent
Kong

(10) Patent No.: US 8,005,201 B2
(45) Date of Patent: Aug. 23, 2011

(54) CALL PROTECTING METHOD AND DEVICE FOR PERSONALIZED RING BACK TONE IN AN INTELLIGENT NETWORK

(75) Inventor: Dechun Kong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 674 days.

(21) Appl. No.: 11/720,196

(22) PCT Filed: Nov. 30, 2004

(86) PCT No.: PCT/CN2004/001378
§ 371 (c)(1),
(2), (4) Date: May 25, 2007

(87) PCT Pub. No.: WO2006/058456
PCT Pub. Date: Jun. 8, 2006

(65) Prior Publication Data
US 2008/0031440 A1    Feb. 7, 2008

(51) Int. Cl.
*H04M 3/42* (2006.01)
*H04M 7/00* (2006.01)
(52) U.S. Cl. ............ 379/201.01; 379/87; 379/207.02; 379/207.16; 379/221.08; 379/221.09; 379/221.11; 379/221.12; 379/257; 379/373.02
(58) Field of Classification Search ............ 379/201.01, 379/201.02, 207.02, 207.16, 221.08, 221.09, 379/221.11, 221.12, 87, 257, 373.01–376.01; 455/414.1
See application file for complete search history.

(56) References Cited

U.S. PATENT DOCUMENTS

| 6,694,004 | B1 * | 2/2004 | Knoerle et al. | .......... 379/211.04 |
| 7,174,009 | B1 * | 2/2007 | Zhang et al. | ............. 379/221.01 |
| 2004/0120494 | A1 | 6/2004 | Jiang et al. | |
| 2005/0243989 | A1 * | 11/2005 | Lee et al. | ................. 379/207.16 |

(Continued)

FOREIGN PATENT DOCUMENTS

CN    1507290 A    6/2004
(Continued)

OTHER PUBLICATIONS

Intl. Search Rept., May 26, 2005.
(Continued)

*Primary Examiner* — Harry Hong
(74) *Attorney, Agent, or Firm* — Kristina Castellano; Castellano PLLC

(57) ABSTRACT

The present invention relates to a call protecting method for the coloring ring back tones in an intelligent network, wherein said intelligent network includes an intelligent network service control point (SCP), a service switch point (SSP) and an intelligent peripheral (IP). The method includes the following steps: an IP-state detecting module is added to the IP for detecting whether the IP is available; the IP-state detecting module sends a state-query request to the IP for checking whether the IP is available; if the IP returns a result of availability, the SCP will direct the SSP to connect the call to the IP; if IP returns a result of unavailability, or returns no IP-state detecting result on time, then the SCP will direct the SSP to connect to the called directly rather than to the IP. In the invention, the call-releasing phenomenon due to the IP state is avoided, the call completing ratio of the coloring ring back tone system is increased, and thus the problem that the subscriber can not receive the call due to the use of the coloring ring back tone is mitigated.

7 Claims, 3 Drawing Sheets

U.S. PATENT DOCUMENTS

2008/0031440 A1 * 2/2008 Kong .................. 379/221.09

FOREIGN PATENT DOCUMENTS

| CN | 1545348 A | 11/2004 |
| EP | 1 768 422 A1 | 3/2007 |
| KR | 20040039111 A | 5/2004 |
| WO | 00/67492 | 11/2000 |
| WO | 01/76205 A1 | 10/2001 |
| WO PCT/CN/2004/001378 | | 4/2005 |

OTHER PUBLICATIONS

Supplementary European Search Report in related EP application EP 04 79 7390, Mar. 22, 2010.

Kihl, M. et al. "On Overload Control of Intelligent Peripherals in Intelligent Networks," Global Telecommunications Conference, 1996. IEEE, vol. 3, Nov. 18, 1996, pp. 1539-1543.

* cited by examiner

CALL PROTECTING METHOD AND DEVICE FOR PERSONALIZED RING BACK TONE IN AN INTELLIGENT NETWORK

CLAIM FOR PRIORITY

This application is a U.S. National Phase entry of PCT/CN2004/001378 filed on Nov. 30, 2004, the entire content of which is hereby incorporated herein by reference.

TECHNICAL FIELD

The present invention relates to a coloring ring back tone (CRBT) system in mobile communication field, especially to a method for protecting the call with coloring ring back tone (CRBT) in an intelligent network (IN) and the device thereof.

BACKGROUND ART

In the prior intelligent network, the system and method for realizing a coloring ring back tone are conducted as follows: when a caller starts a call, a calling or called exchange triggers an intelligent network service (the first intelligent network service), and the service directs the exchange to connect the call to an intelligent peripheral (IP), then the intelligent peripheral (IP) triggers a coloring ring back tone service (the second intelligent network service), the coloring ring back tone service directs the IP to connect the called, and plays a coloring ring back tone to the caller. Specifically, the coloring ring back tone service system is used to provide a coloring ring back tone service to the subscriber in mobile communication system. Said mobile communication network includes a caller, a called subscriber (or called), a home location register (HLR), a MSC, and a base station. Said coloring ring back tone service system includes a signal interface unit (SIU), a service control point (SCP), a service management unit (SMP), and a coloring ring back tone server, wherein the SIU, SCP, SMP are interconnected with Transmission Control Protocol/Internet Protocol (TCP/IP), and SIU is also connected to mobile communication network through a No. 7 signaling network, while the coloring ring back tone server stores coloring ring back tones and is connected to the mobile communication system through the signaling system No. 7 and speech channel trunk. When calling, the coloring ring back tone is transmitted to the caller by the coloring ring back tone server. Said coloring ring back tone server is a SPC (stored program control) switch as a physical device.

The method for realizing the coloring ring back tone service includes the following steps: step 1: the subscriber of the mobile communication network sets up a HLR-based unconditional call forwarding number by cell phone, wherein the forwarding destination number is the number of the coloring ring back tone service system; step 2: a caller calls a called, and the call from the caller is transmitted to a coloring ring back tone server; step 3: the coloring ring back tone server triggers the coloring ring back tone service, interacts with the SCP, and decides the service flow and the music or speech that needs to be played; step 4: the coloring ring back tone server plays a coloring ring back tone and continues the call connection.

However, in this networking method, when the first service directs to connect the call to an IP, since the trunk from the exchange to the IP is occupied, or the IP outgoing trunk is occupied, or the IP fails in triggering the service, etc. the phenomenon that the called subscriber can not receive the call will occur, which means the call completion ratio decreases due to the reason that the subscriber applies for a new service. Thus it will result in the dissatisfaction of subscribers with the telecommunication service.

SUMMARY OF THE INVENTION

The main idea of the invention is to advance a method for protecting the call with a coloring ring back tone in an intelligent network, and by pre-checking the state of playing device, the call completion ratio of the primary coloring ring back tone system is increased and the phenomenon that the subscriber may not receive the call due to the use of coloring ring back tone reduces.

The main idea of the invention is to advance a device for protecting the call with a coloring ring back tone in an intelligent network. An IP-state detecting module is added to the IP to detect whether the IP is available. The call completion ratio of the primary coloring ring back tone system is increased and the phenomenon that the subscriber may not receive the call due to the use of the coloring ring back tone reduces.

For the purposes above, the invention disclosed a method for protecting the call with a coloring ring back tone in an intelligent network. Said intelligent network includes an IN service control point (SCP), a service switch point (SSP), and an IP. Said method includes the following steps of:

Step 1, adding an IP state detection module to the IP to detect whether the IP is available;

Step 2, sending a state-checking request to the IP by the IP-state detecting module to check whether the IP is available;

Step 3, if the IP returns a result of availability, the IN SCP directing the SSP to connect the call to the IP; and Step 4, if the IP returns a result of unavailability, or returns no IP-state detecting result on time, the IN SCP directing the SSP to connect to the called directly rather than to the IP.

The state that whether said IP is available includes whether the resource is available and whether the IP processing ability supports.

Whether said resource is available includes checking whether there is a free junction circuit on the IP and whether the signaling path from IP to the neighboring office direction can be reached.

Whether said IP processing ability supports includes checking whether the utilization ratio of the CPU of the IP reaches an extremum.

Said extremum is 80%.

Said method for protecting the call with a coloring ring back tone in an intelligent network also includes the following steps of:

(61) a caller dialing a called number, and a No. 7 signaling message IAM reaching the SSP;

(62) the SSP sending an IN service trigger message to the SCP;

(63) the IN service module on the SCP sending the IP-state detecting request to the IP;

(64) returning the result of whether the IP being available;

(65) the IP sending the IN service trigger message to the SCP;

(66) the SSP sending the IAM message to the IP; and

(67) the loaded service module of playing the coloring ring back tone directing the IP to connect to the called.

In the invention, a device for protecting the call with a coloring ring back tone in an intelligent network is also disclosed. Said intelligent network includes an IN SCP, a SSP, and an IP. An IP-state detecting module is added to said IP to detect whether the IP is available.

In the invention, the call-releasing phenomenon due to the IP state is avoided, the call completion ratio of the coloring ring back tone system is increased, and thus the problem that the subscriber can not receive the call due to the coloring ring back tone is mitigated.

DETAILED DESCRIPTION OF THE INVENTION

The main steps of said call protection method of the invention are as follow:

Step 1, adding an IP state detection module for detecting whether the IP is available to the IP, the principle for detecting whether the IP is available being to detect whether the resource is available and whether the IP processing ability is able to support.

Step 2, before the service logic module on SCP1 directs SSP to connect the call to the IP, first sending a state checking request to the IP to detect whether the IP is available, then processing discriminatively according to the result returned by the IP; if the IP returning a result of availability, the SCP1 directing the SSP to connect the call to the IP; if the IP returning a result of unavailability, or returning no IP-state detecting result on time, the SCP1 supporting SSP to implement normal call processing rather than to connect to the IP.

First, a state detecting module needs to be added to the IP to support the IP-state detection. The principle for the IP-state detecting module to detect whether the IP is available is to detect whether the resource is available and whether the IP processing ability is able to support. The method for judging whether the resource is available is to check whether there is any free junction circuit on the IP and whether the signaling path from IP to the neighboring office direction can be reached. The method for judging whether the processing ability is able to support is to check whether the CPU of the IP reaches an extremum (usually, it can be set at 80% and can be adjusted according to requests).

Figure 1:
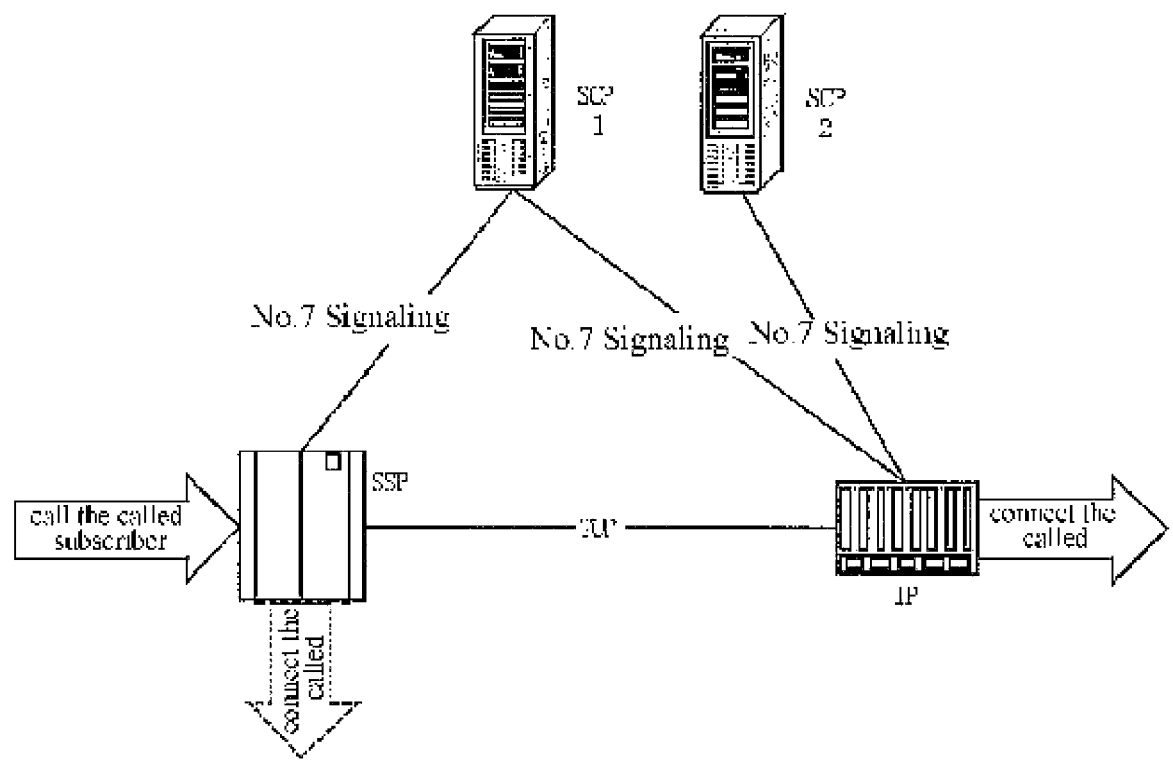
FIG. 1 is a schematic view of networking of a coloring ring back tone system in the intelligent network.

Second, the IN SCP implements the service logic modification, which will be described in detail in connection with the drawings:

FIG. 1 shows every device of the invention which accords with the coloring ring back tone system in the IN: it consists of an IN service control point (SCP), a service switch point (SSP), and an intelligent peripheral (IP), among which, two SCPs can be a combined device, in which case there is only one SCP, if the two SCPs are not combined, a No. 7 signaling link is required between the SCP1 and the IP. The IN service module is loaded on SCP1, which means when the subscriber using a coloring ring back tone is called, the first IN service will be triggered by the SSP first. The method of the invention is realized by adding an IP-state detection for availability to this module. In the invention, IP has a correct judgment about the availability of the IP state, and the SCP1 can decide the subsequent processing of the call according to result of the IP-state detection; other devices (including software and hardware) of the coloring ring back tone system are not changed.

Figure 2:
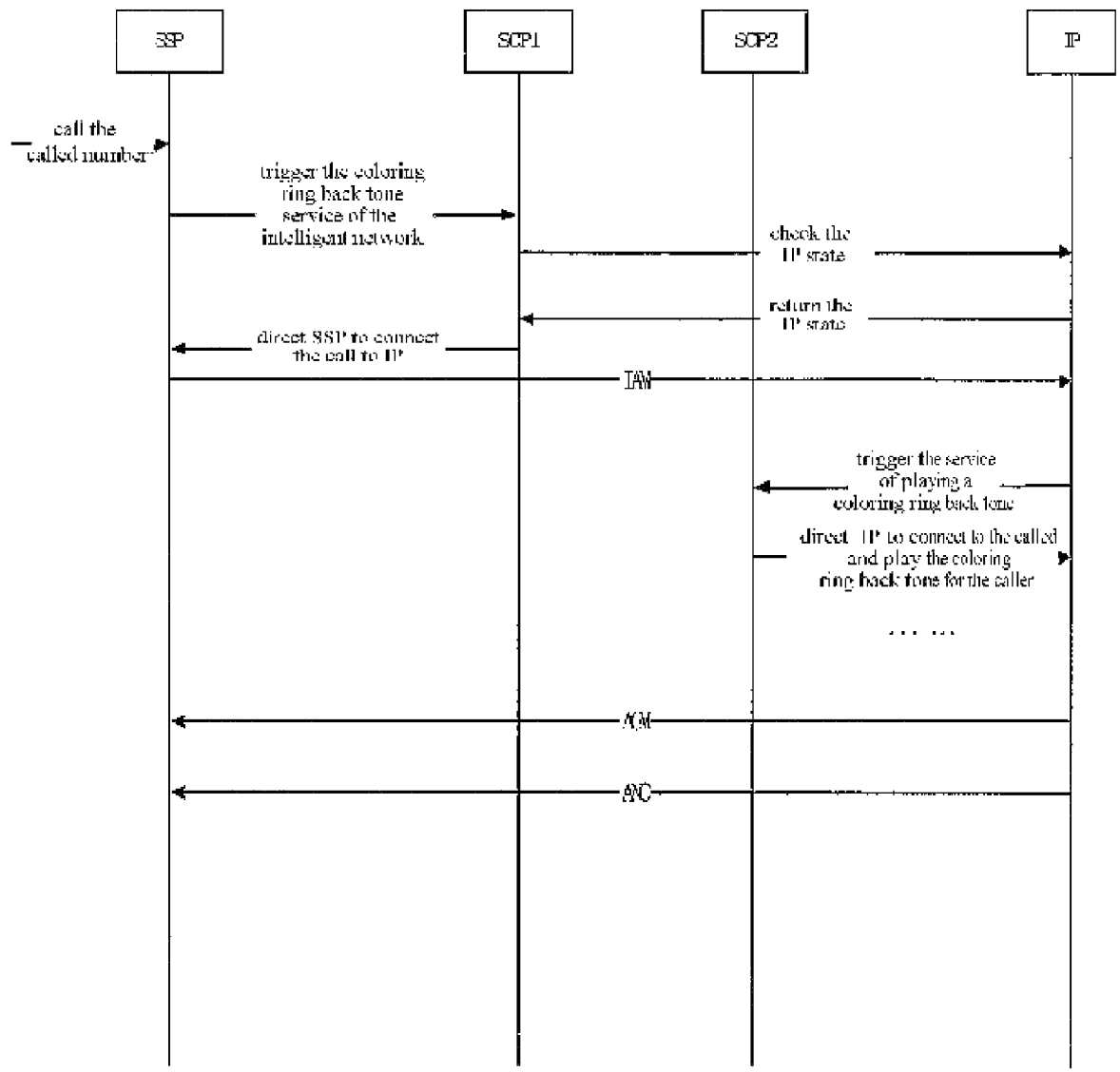
FIG. 2 is a schematic view of signaling flow of the invention.

FIG. 2 is a schematic view of the signaling flow when the call of the invention is being protected, in which the signaling flow between SSP, SCP and IP when the call protection for the subscriber using a coloring ring back tone occurs is described. According to the drawing:

1. at the beginning, the caller dials the called number, and a No. 7 signaling message IAM reaches the SSP;

2. the SSP sends an IN service trigger message to the SCP1 (for example, it is an IDP message in PHS or GSM network);

3. the IN service module on the SCP1 sends an IP state-checking request to the IP;

4. the IP returns a result of whether the IP is available according to the judging principle for whether the IP-state being available;

5. the SCP1 receives a result of availability, and directs the SSP to connect the call to the IP;

6. the SSP sends the IAM message to the IP;

7. the IP sends the IN service trigger message to the SCP2 (IDP message);

8. the loaded service module of playing the coloring ring back tone on the SCP2 directs the IP to connect the called.

Figure 3:
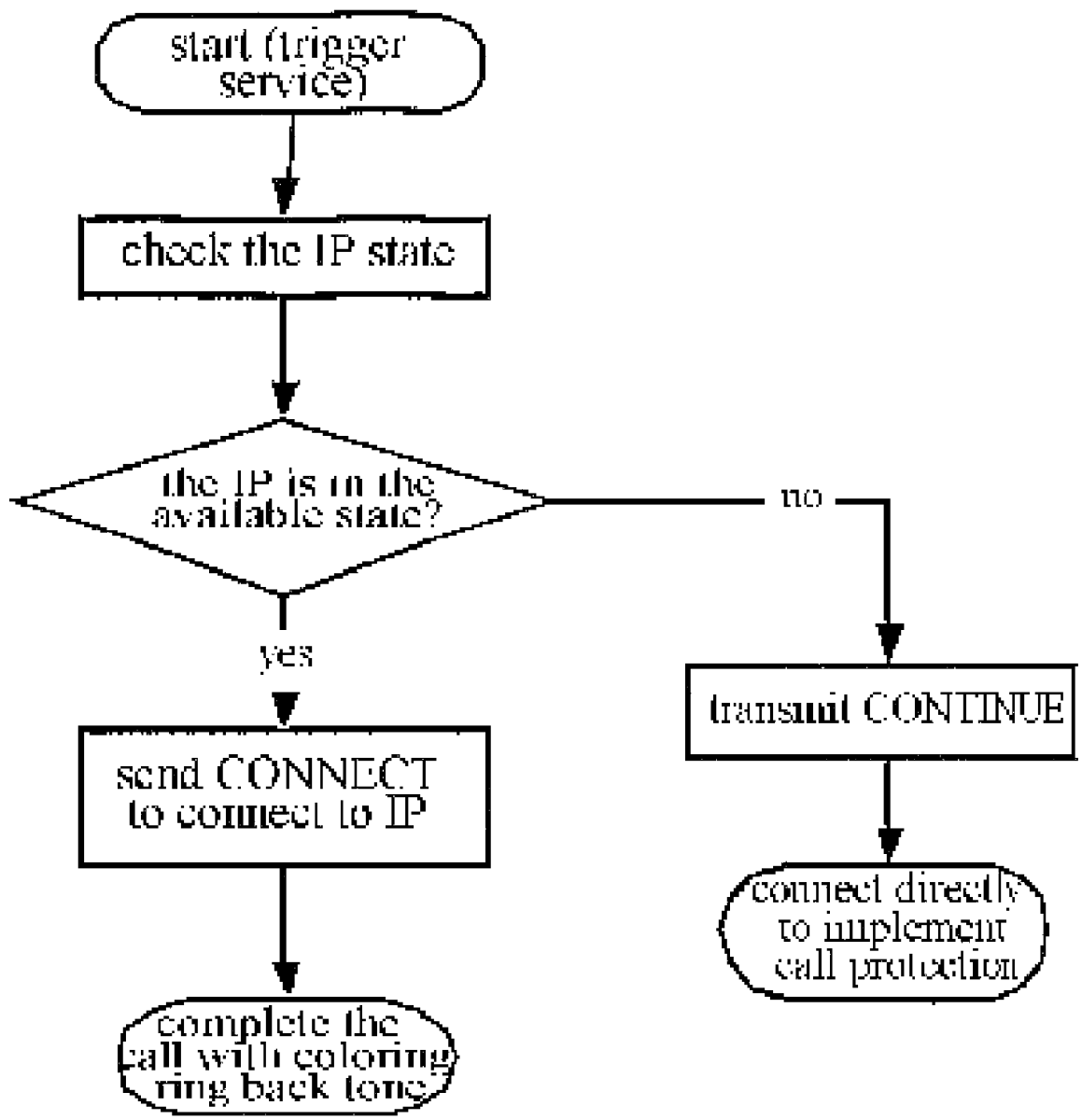
FIG. 3 is a schematic view of service logic flow of the invention.

FIG. 3 is a drawing of the service logic flow of the invention. Taking the coloring ring back tone service in GSM network as an example, an embodiment of said call protection method will be described below. The main steps are as follow:

1. first, adding a judging principle for the availability of the IP-state to the IP, said principle being based on whether the resource is available and whether the IP processing ability is able to support;

2. triggering an MT flow of a prepaid service subscriber with the coloring ring back tone to the SCP1, the SCP1 checking the IP-state first by adopting the EXECUTE operation;

3. the SCP directing the SSP to or not to connect to the IP according to the returned result of the IP-state;

4. if the returned state is that the IP is available, the SCP directing the SSP to connect to the IP to complete the call with the coloring ring back tone service; and 5. if the returned state is that the IP is unavailable, the SCP directing the SSP to connect to the called directly to complete call protection, avoiding the call failure due to the unavailability of the IP.

According to the device and service method described above, the call completion ratio of the coloring ring back tone system is increased, and thus the problem that the subscriber can not receive the call due to the coloring ring back tone is mitigated.

INDUSTRIAL APPLICABILITY

In the invention, the call-releasing phenomenon due to the IP state is avoided, the call completion ratio of the coloring ring back tone system is increased, and thus the problem that the subscriber can not receive the call due to the coloring ring back tone is mitigated.

What I claim is:

1. A method for protecting call with coloring ring back tone in an intelligent network, wherein said intelligent network includes an intelligent network service control point (SCP), a service switch point (SSP), and an intelligent peripheral (IP), comprising the following steps of:

Step 1, adding an IP state-detecting module to the IP to detect whether the IP is available;

Step 2, sending a state-checking request to the IP by the IP state-detecting module to check whether the IP is available;

Step 3, directing the SSP by the intelligent network SCP to connect the call to the IP if the IP returns a result that the IP is available; and Step 4, supporting the SSP to connect to a called subscriber directly rather than to the IP by the intelligent network SCP if the IP returns a result that the IP is unavailable, or returns no detection result of the IP state on time.

2. The method for protecting call with coloring ring back tone in an intelligent network of claim 1, wherein said state of whether the IP is available includes whether resource is available and whether the IP processing ability is able to support.

3. The method for protecting call with coloring ring back tone in an intelligent network of claim 2, wherein whether said resource is available includes checking whether a free junction circuit is on the IP and whether signaling path from the IP to neighboring office direction is achievable.

4. The method for protecting call with coloring ring back tone in an intelligent network of claim 2, wherein whether said IP processing ability is able to support includes checking whether CPU of the IP reaches an extremum.

5. The method for protecting call with coloring ring back tone in an intelligent network of claim 4, wherein said extremum is 80%.

6. The method for protecting call with coloring ring back tone in an intelligent network of claim 1, comprising the following steps of:
   dialing a called number by a caller, and a No.7 signaling message IAM reaching the SSP;
   sending an intelligent network service trigger message to the SCP by the SSP;
   sending an IP state-checking request to the IP by an intelligent network service module on the SCP;
   returning a result of whether the IP is available;
   sending the intelligent network service trigger message to the SCP by the IP;
   sending the message IAM to the IP by the SSP; and
   directing the IP to connect to the called by a loaded service module of playing coloring ring back tone.

7. A system for protecting call with coloring ring back tone in an intelligent network,
   comprising the following components: an intelligent network service control point (SCP), a service switch point (SSP) and an intelligent peripheral (IP), said IP having an IP state-detecting module added thereto for detecting whether the IP is available, wherein
   the IP state-detecting module is configured to send a state-checking request to the IP to check whether the IP is available, and
   the intelligent network SCP is configured to direct the SSP to connect the call to the IP if the IP returns a result that the IP is available, and to support the SSP to connect to a called subscriber directly rather than to the IP if the IP returns a result that the IP is unavailable, or returns no detection result of the IP state on time.

* * * * *